(12) United States Patent
Sugiura et al.

(10) Patent No.: US 11,897,517 B2
(45) Date of Patent: Feb. 13, 2024

(54) INFORMATION PROCESSING DEVICE, INFORMATION PROCESSING METHOD, COMPUTER PROGRAM PRODUCT, AND VEHICLE CONTROL SYSTEM

(71) Applicant: KABUSHIKI KAISHA TOSHIBA, Tokyo (JP)

(72) Inventors: Takayuki Sugiura, Ota (JP); Akihito Seki, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 186 days.

(21) Appl. No.: 17/190,681

(22) Filed: Mar. 3, 2021

(65) Prior Publication Data
US 2022/0032969 A1 Feb. 3, 2022

(30) Foreign Application Priority Data
Jul. 30, 2020 (JP) .................................. 2020-129662

(51) Int. Cl.
*B60W 60/00* (2020.01)
*G06T 7/73* (2017.01)
(Continued)

(52) U.S. Cl.
CPC ... *B60W 60/00272* (2020.02); *G06F 18/2431* (2023.01); *G06T 7/73* (2017.01);
(Continued)

(58) Field of Classification Search
CPC ......... B60W 60/00272; B60W 2420/42; G06F 18/2431; G06T 7/73; G06T 2207/30252; G06V 20/56
See application file for complete search history.

(56) References Cited

U.S. PATENT DOCUMENTS 9,881,235 B1 * 1/2018 Narimanzadeh .... G06F 18/2136
2017/0019657 A1 1/2017 Livyatan et al.
(Continued)

FOREIGN PATENT DOCUMENTS

CN 110296691 A 10/2019
JP 2000-502447 A 2/2000
(Continued)

OTHER PUBLICATIONS

Vasiljevic, I. et al., "Neural Ray Surfaces for Self-Supervised Learning of Depth and Ego-motion," 3DV 2020 oral, arXiv:2008.06630v1 [cs.CV], Aug. 15, 2020, 14 pages.
(Continued)

*Primary Examiner* — James J Lee
*Assistant Examiner* — Jonathan E Reinert
(74) *Attorney, Agent, or Firm* — Oblon, McClelland, Maier & Neustadt, L.L.P.

(57) ABSTRACT

According to an embodiment, an information processing device includes one or more processors. The processors are configured to: acquire a plurality of pieces of detection information including detection results at two-dimensional positions different from each other acquired by detection of an object by one or more detection devices through a transmission body, the plurality of pieces of detection information including distortion due to the transmission body that exists between the detection devices and the object; detect a feature point from each of the plurality of pieces of detection information; and estimate, by minimizing an error between a three-dimensional position corresponding to the feature point and a detection position of the feature point corrected based on a distortion map expressing distortion at each of the two-dimensional positions, the distortion map, the three-dimensional position, and the detection position.

14 Claims, 11 Drawing Sheets

(51) Int. Cl.
  *G06V 20/56* (2022.01)
  *G06F 18/2431* (2023.01)
(52) U.S. Cl.
  CPC ......... *G06V 20/56* (2022.01); *B60W 2420/42* (2013.01); *G06T 2207/30252* (2013.01)

(56) References Cited

U.S. PATENT DOCUMENTS

2017/0345180 A1* 11/2017 Sugiura .................... G06T 7/70
2018/0288401 A1* 10/2018 Eshima .................. G06T 7/285
2019/0102869 A1    4/2019 Terada et al.
2020/0410650 A1* 12/2020 Yamazaki ............. H04N 25/61

FOREIGN PATENT DOCUMENTS

| JP | 2019-68272 A | 4/2019 | |
|---|---|---|---|
| WO | WO 2017/057057 A1 | 4/2017 | |
| WO | WO 2019/171984 A1 | 9/2019 | |
| WO | WO-2019171984 A1 * | 9/2019 | ............. G03B 15/00 |

OTHER PUBLICATIONS

Verbiest, F. et al., "Modeling the Effects of Windshield Refraction for Camera Calibration," ECCV 2020, 16 pages.

* cited by examiner

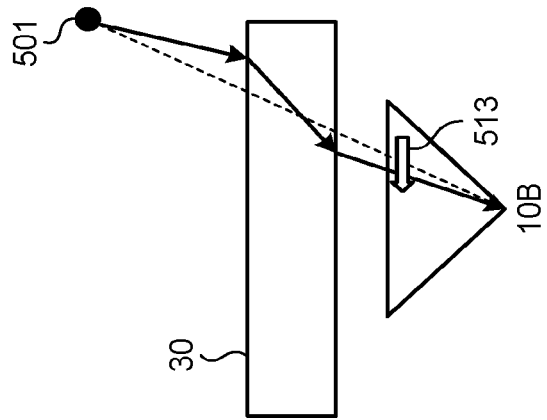
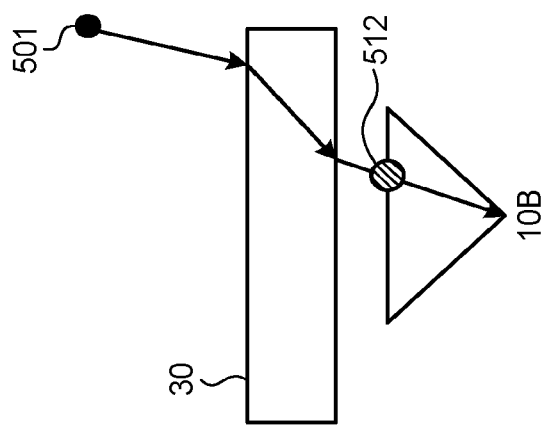
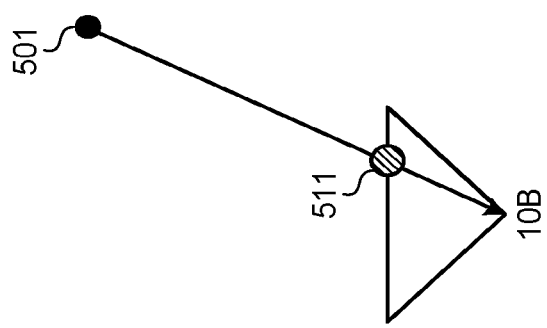
FIG.5

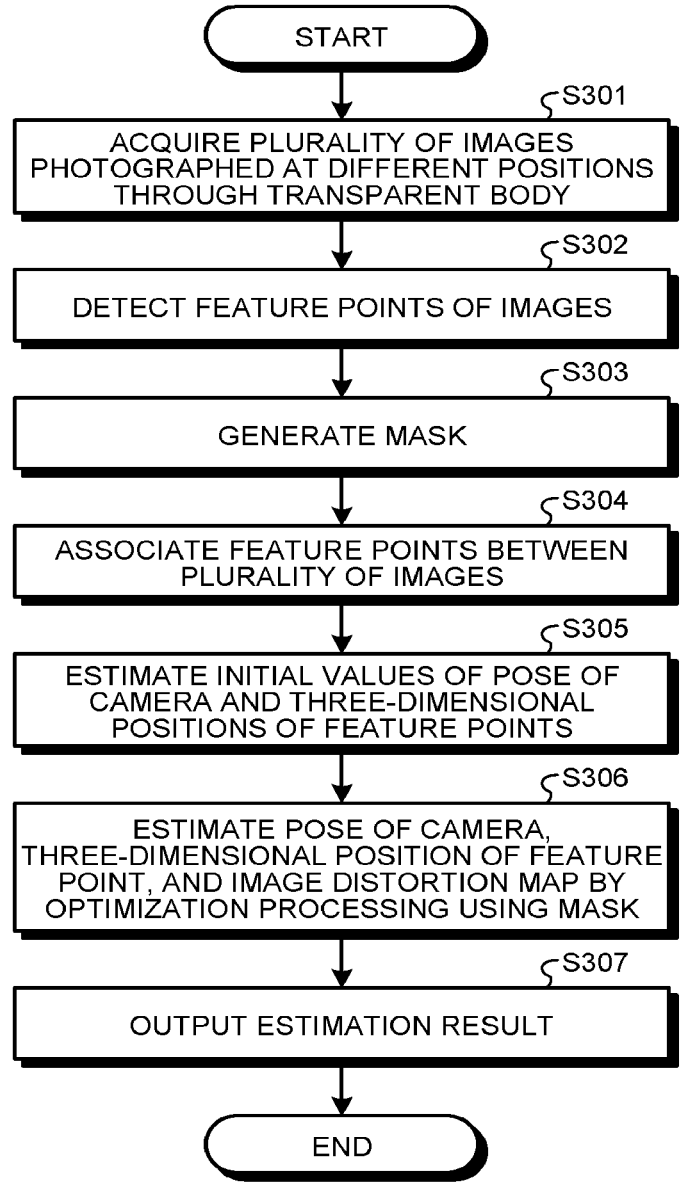

INFORMATION PROCESSING DEVICE, INFORMATION PROCESSING METHOD, COMPUTER PROGRAM PRODUCT, AND VEHICLE CONTROL SYSTEM

CROSS-REFERENCE TO RELATED APPLICATIONS

This application is based upon and claims the benefit of priority from Japanese Patent Application No. 2020-129662, filed on Jul. 30, 2020; the entire contents of which are incorporated herein by reference.

FIELD

Embodiments described herein relate generally to an information processing device, an information processing method, a computer program product, and a vehicle control system.

BACKGROUND

In automatic driving and driver assistance, a technology of detecting a peripheral region, an obstacle, and the like by using a camera image has been known. A technology of estimating a position of an object or a distance to the object by using a plurality of images captured at a plurality of different positions, such as images captured by a stereo camera or time-series images captured by a camera mounted on a mobile body has been known.

However, in the related art, there is a case where a position or the like of an object cannot be estimated with high accuracy in a case where there is a transmission body such as glass between a camera and the object.

BRIEF DESCRIPTION OF THE DRAWINGS

FIG. 5 is a view illustrating an example of image distortion due to an influence of a windshield;
FIG. 14 is a flowchart of estimation processing in the third embodiment.

DETAILED DESCRIPTION

Figure 1:
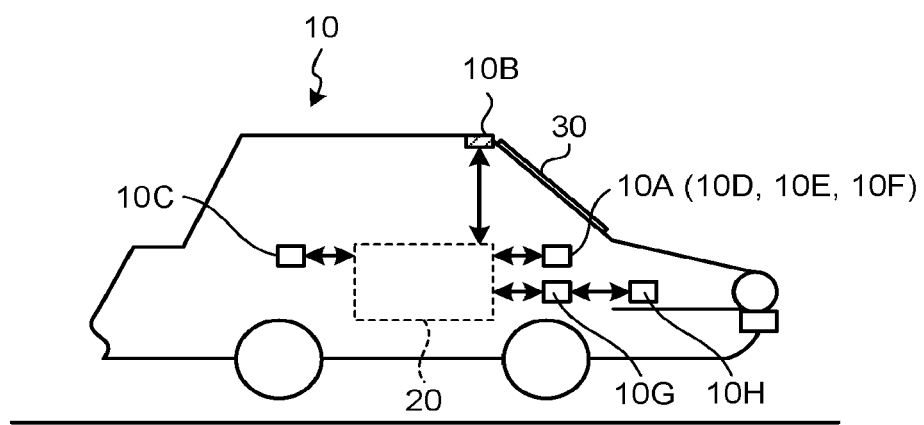
FIG. 1 is a view illustrating an example of a mobile body of an embodiment.

According to an embodiment, an information processing device includes one or more processors. The processors are configured to: acquire a plurality of pieces of detection information that is information including detection results at two-dimensional positions different from each other acquired by detection of an object by one or more detection devices through a transmission body, the plurality of pieces of detection information including distortion due to the transmission body that exists between the detection devices and the object; detect a feature point from each of the plurality of pieces of detection information; and estimate, by minimizing an error between a three-dimensional position corresponding to the feature point and a detection position of the feature point corrected based on a distortion map expressing distortion at each of the two-dimensional positions, the distortion map, the three-dimensional position, and the detection position.

In the following, embodiments of an information processing device will be described in detail with reference to the accompanying drawings.

As described above, a technology of estimating a position of an object or a distance to the object by using a plurality of images has been known. For example, in a technology of using a stereo camera, in a state in which two cameras arranged horizontally on the right and left are used and a relative positional relationship between the two cameras is known, a distance from the cameras to an object is estimated by disparity (stereo disparity) calculated from associating of pixels. Also, structure from motion (SfM) is a technology of reconstructing a three-dimensional shape of an object from a camera motion by minimizing a reprojection error that is a difference between reprojection positions of three-dimensional points on a plurality of images and positions of feature points detected from the images (three-dimensional reconstruction).

In such a technology, it is necessary to calculate projection of a three-dimensional point onto an image plane by following a light ray by three-dimensional geometric calculation.

On the one hand, a camera is often installed inside a car in consideration of a traveling environment of the car. Thus, the camera captures an image through a windshield. Since imaging is performed through the windshield, light is refracted and the image is distorted. In a case where this distortion is not considered, an error is generated in stereo disparity and three-dimensional reconstruction by SfM. For example, camera calibration to correct image distortion due to a lens or the like together with a focal length and optical center of a camera has been known. The camera calibration is executed offline in advance from an image acquired by imaging of a known object such as a board on which a checker pattern of a known size is printed. However, such a method requires a special device and preprocessing.

As technologies of reducing an error in three-dimensional reconstruction due to image distortion caused by glass, there are the following methods.

(T1) An image captured through glass is corrected by an optical distortion distribution, and a depth distance to an object is estimated by utilization of the corrected image by a known method in which glass distortion is not considered.

(T2) By being associated with a three-dimensional point estimated from a motion of one camera of a stereo camera, a relative positional relationship of the other camera and a camera parameter including an image distortion parameter are estimated.

In (T1), since a corrected image is generated by an optical distortion distribution, an error in the distortion distribution has a great influence on accuracy of a depth estimation method in the following stage in which glass distortion is not considered. Also, since correction is performed for each image, geometrical consistency of an object is not guaranteed between a plurality of images. In (T2), a three-dimensional point estimated by one camera motion of the stereo camera include distortion of the camera. Thus, estimation accuracy of a distortion parameter of the other side is influenced.

First Embodiment

An information processing device according to the first embodiment uses a distortion map in which distortion of an image due to distortion of glass is approximated by a flow at each position on the image. Then, the information processing device according to the present embodiment performs three-dimensional reconstruction in such a manner as to simultaneously estimate a camera motion, a position of a three-dimensional feature point, and a distortion map. This enables more accurate estimation.

Note that in the following, an example in which a camera (imaging device) and an image are respectively used as a detection device to detect information of an object to be estimated and detection information including a detection result by the detection device will be described. The detection device may be a device other than a camera as long as being a device that detects an object by using electromagnetic waves and outputs, as detection information, information including a detection result at each two-dimensional position. The information including a detection result at each two-dimensional position is information including a detection result as a value at each two-dimensional position, such as a two-dimensional image including a pixel value at each two-dimensional position. For example, a distance image including, at each two-dimensional position, a value indicating a distance from a detection device to an object can be used as the detection information.

For example, an infrared camera that images an object by using infrared rays and outputs an infrared image as detection information, and light detection and ranging or laser imaging detection and ranging (LiDAR) that images an object by using laser light and outputs a distance image as detection information may be used as detection devices. In a case where any of the detection devices is used, it is assumed that electromagnetic waves can be detected through a transmission body that is an object to transmit used electromagnetic waves.

The transmission body includes a transparent body such as a windshield. In the following, an example in which a transparent body that transmits visible light is used as a transmission body will be described. The transparent body is not limited to the windshield, and may be glass included in a direction different from a traveling direction, such as side glass and rear glass. Also, the transparent body may be in a form of a glass case installed to protect the camera. Also, the transparent body is not limited to glass. The transparent body may be, for example, water or acrylic other than air as long as a camera can image an object through the transparent body. Here, an example in which a transparent body that transmits visible light is used as the transmission body is described. However, a transmission body that transmits electromagnetic waves or the like may be used depending on an object to be detected by a detection device.

FIG. 1 is a view illustrating an example of a mobile body 10 on which an information processing device of the first embodiment is mounted.

The mobile body 10 includes an information processing device 20, a windshield 30, an output unit 10A, a camera 10B, a sensor 10C, a power control unit 10G, and a power unit 10H.

Examples of the mobile body 10 include a vehicle, a truck, a railroad, a mobile robot, a flying body, a human being, and the like, but are not limited thereto. Examples of the vehicle include a motorcycle, a four-wheel automobile, a bicycle, and the like. Also, the mobile body 10 may be, for example, a mobile body that travels through driving operation by a person, or may be a mobile body that can automatically travel (perform autonomous traveling) without driving operation by a person.

The information processing device 20 is realized by dedicated or general-purpose computer hardware, for example. The information processing device 20 estimates a position of an object such as an object on a road (such as other vehicle or obstacle) from an image captured by the camera 10B.

Note that the information processing device 20 is not limited to a form mounted on the mobile body 10. The information processing device 20 may be mounted on a stationary object. A stationary object is an immovable object such as an object fixed to the ground. Examples of the stationary object fixed to the ground include a guardrail, pole, parked vehicle, road sign, and the like. Also, for example, the stationary object is an object in a state of being stationary with respect to the ground. Also, the information processing device 20 may be mounted on a cloud server that executes processing on a cloud system.

The power unit 10H is a drive mechanism mounted on the mobile body 10. Examples of the power unit 10H include an engine, a motor, wheels, and the like.

The power control unit 10G (example of vehicle control device) controls the power unit 10H. The power unit 10H is driven under the control of the power control unit 10G.

The output unit 10A outputs information. For example, the output unit 10A outputs estimation result information indicating an estimation result of a position of an object, which is estimated by the information processing device 20.

The output unit 10A includes, for example, a communication function of transmitting estimation result information, a display function of displaying the estimation result information, a sound output function of outputting a sound indicating the estimation result information, and the like. For example, the output unit 10A includes at least one of a communication unit 10D, a display 10E, and a speaker 10F. In the following, the output unit 10A will be described with a configuration including the communication unit 10D, the display 10E, and the speaker 10F being an example.

The communication unit 10D transmits the estimation result information to another device. For example, the communication unit 10D transmits the estimation result information to another device via a communication line. The display 10E displays information related to the estimation result. Examples of the display 10E include a liquid crystal display (LCD), a projection device, a light, and the like. The speaker 10F outputs a sound indicating information related to the estimation result.

Examples of the camera 10B include a monocular camera, a stereo camera, a fish-eye camera, an infrared camera, and the like. The number of cameras 10B is not limited. Also, a captured image may be a color image including three channels of RGB, or may be a one-channel monochrome image expressed in gray scale. The camera 10B captures time-series images around the mobile body 10. The camera 10B outputs the time-series images by imaging a periphery of the mobile body 10 in a time-series manner, for example. The periphery of the mobile body 10 is, for example, a region within a predetermined range from the mobile body 10. This range is, for example, a range in which the camera 10B can perform imaging.

In the following, a case where the camera 10B is installed in such a manner that a front side of the mobile body 10 is included as an imaging direction via the windshield 30 will be described as an example. That is, the camera 10B images the front side of the mobile body 10 in a time-series manner.

The sensor 10C is a sensor that measures measurement information. The measurement information includes, for example, a speed of the mobile body 10, and a steering angle of a steering wheel of the mobile body 10. Examples of the sensor 10C include an inertial measurement unit (IMU), a speed sensor, a steering angle sensor, and the like. The IMU measures measurement information including triaxial acceleration and triaxial angular velocity of the mobile body 10. The speed sensor measures speed from a rotation amount of a tire. The steering angle sensor measures a steering angle of the steering wheel of the mobile body 10. Also, for example, the sensor 10C is a depth distance sensor that measures a distance to an object, such as LiDAR.

Next, an example of a functional configuration of the mobile body 10 of the first embodiment will be described in detail.

Figure 2:
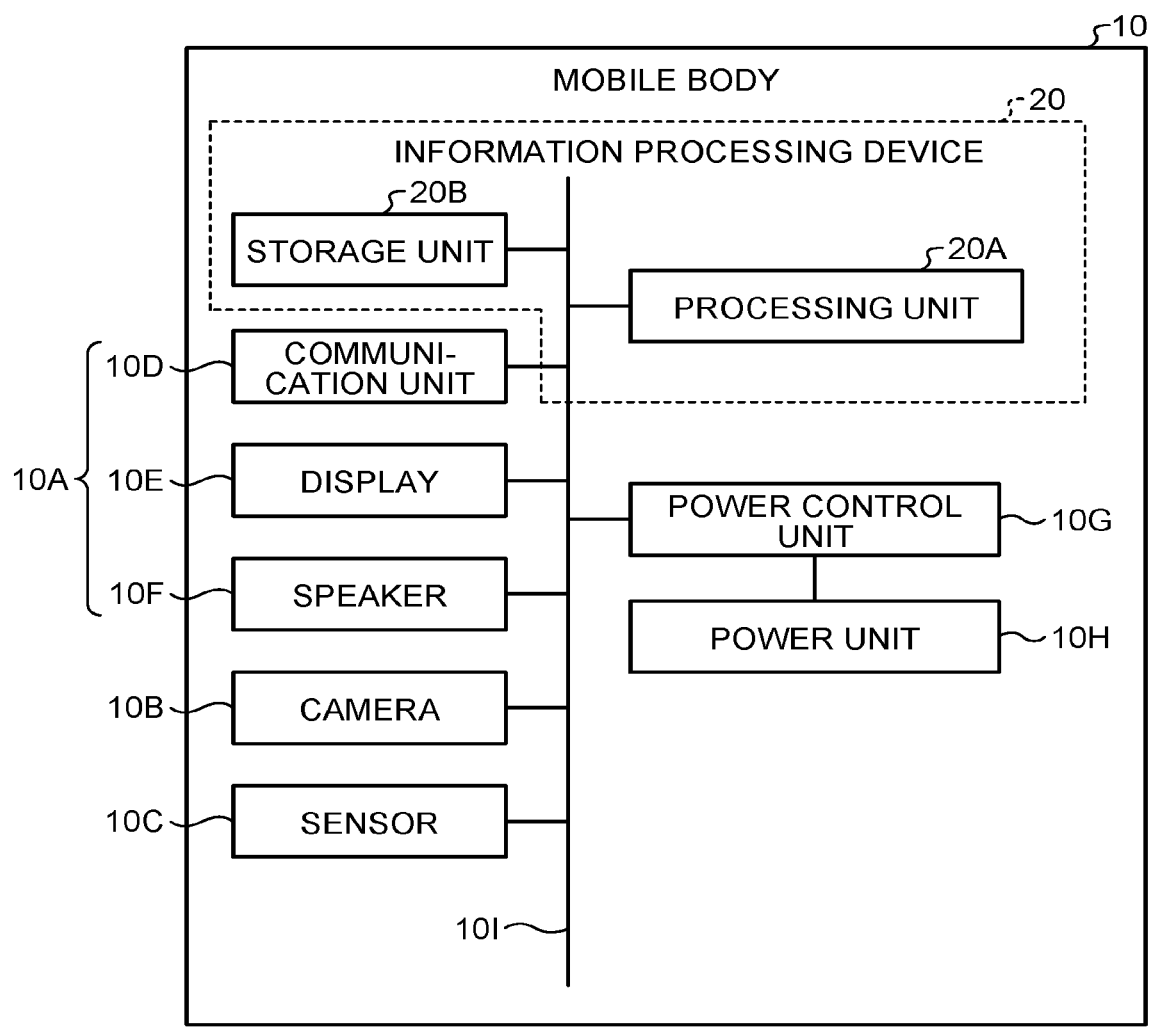
FIG. 2 is a view illustrating an example of a functional configuration of the mobile body of the embodiment.

FIG. 2 is a view illustrating an example of a functional configuration of the mobile body 10 of the first embodiment.

The mobile body 10 includes an information processing device 20, an output unit 10A, a camera 10B, a sensor 10C, a power control unit 10G, and a power unit 10H. The information processing device 20 includes a processing unit 20A and a storage unit 20B. The output unit 10A includes a communication unit 10D, a display 10E, and a speaker 10F.

The processing unit 20A, the storage unit 20B, the output unit 10A, the camera 10B, the sensor 10C, and the power control unit 10G are connected via a bus 10I. The power unit 10H is connected to the power control unit 10G.

Note that the output unit 10A (communication unit 10D, display 10E, and speaker 10F), the camera 10B, the sensor 10C, the power control unit 10G, and the storage unit 20B may be connected via a network. A communication method of the network used for the connection may be a wired method or may be a wireless method. Also, the network used for the connection may be realized by a combination of a wired method and a wireless method.

Examples of the storage unit 20B include a semiconductor memory element, a hard disk, an optical disk, and the like. Examples of the semiconductor memory element include a random access memory (RAM), a flash memory, and the like. Note that the storage unit 20B may be a storage device provided outside the information processing device 20. Also, the storage unit 20B may be a storage medium. Specifically, the storage medium may be what stores or temporarily stores a program and various kinds of information downloaded via a local area network (LAN), the Internet, or the like. Also, the storage unit 20B may include a plurality of storage media.

Figure 3:
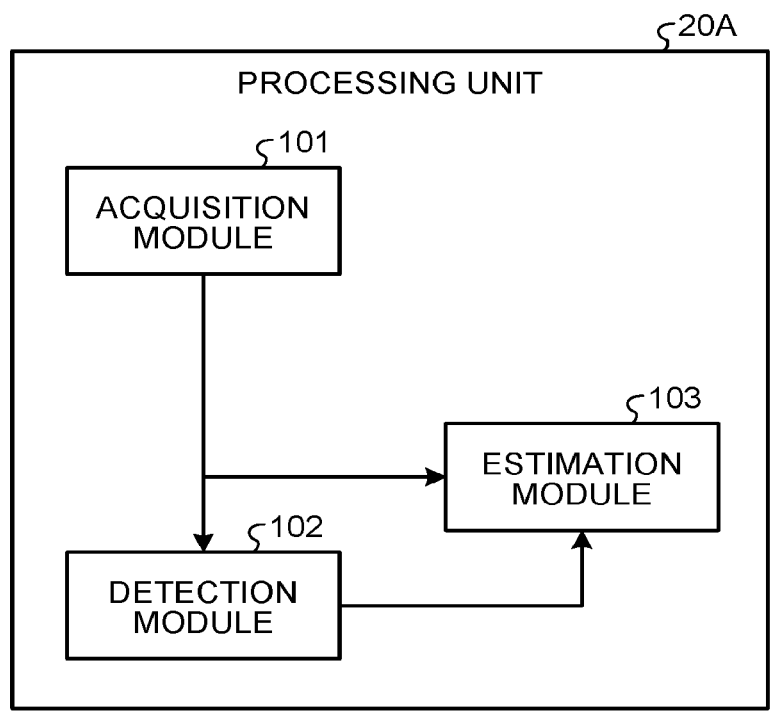
FIG. 3 is a block diagram of a processing unit of a first embodiment.

FIG. 3 is a block diagram illustrating an example of a functional configuration of the processing unit 20A. As illustrated in FIG. 3, the processing unit 20A includes an acquisition module 101, a detection module 102, and an estimation module 103.

The acquisition module 101 acquires a plurality of images (example of detection information) captured at different imaging positions (example of detection position). The imaging position represents a position of the camera 10B of when an image is captured. In a case where the one camera 10B is used, the acquisition module 101 acquires a plurality of images captured by the camera 10B respectively at a plurality of imaging positions that fluctuates along with movement of the mobile body 10, for example. In a case where the camera 10B is a stereo camera, it may be interpreted that imaging positions of right and left cameras included in the stereo camera are different from each other. For example, the acquisition module 101 may acquire two images respectively captured by the right and left cameras at a certain time.

As described above, since the camera 10B performs imaging through the windshield 30, an image may include distortion due to the windshield 30. In the following, there is a case where an image acquired by the acquisition module 101 is referred to as a distorted image.

The detection module 102 detects a feature point from each of a plurality of acquired distorted images. A feature point detection method may be any detection method. For example, the detection module 102 can detect a feature point by using a Harris detector. The detection module 102 may use a detection method in which it is considered that the images are distorted by the windshield 30. For example, the detection module 102 may set a threshold to determine a feature point looser than a case where it is not considered that the images are distorted.

The estimation module 103 estimates a position of an object captured in the images from the detected feature points. For example, from the plurality of feature points respectively detected for the plurality of distorted images, the estimation module 103 estimates and outputs a pose of the camera 10B of when the distorted images are captured, positions in three dimensions (three-dimensional position) of the feature points, and distortion maps corresponding to the distorted images. The pose of the camera 10B includes, for example, a position and posture of the camera 10B. For example, by minimizing an error between a detection position of a feature point, which is corrected on the basis of a distortion map, and a three-dimensional position, the estimation module 103 estimates the distortion map, the three-dimensional position, and the detection position. The distortion map is information that includes an amount of displacement at each two-dimensional position as distortion.

For example, the processing unit 20A may be realized by execution of a program by a processor such as a central processing unit (CPU), that is, by software. Also, for example, the processing unit 20A may be realized by one or more processors such as a dedicated integrated circuit (IC), that is, by hardware. Also, for example, the processing unit 20A may be realized by a combination of software and hardware.

Note that wording "processor" used in embodiments includes, for example, a CPU, a graphical processing unit (GPU), an application specific integrated circuit (ASIC), and a programmable logic device. Examples of the programmable logic device include a simple programmable logic device (SPLD), a complex programmable logic device (CPLD), a field programmable gate array (FPGA), and the like.

The processor realizes the processing unit 20A by reading and executing a program stored in the storage unit 20B. Note that instead of being stored in the storage unit 20B, the program may be directly incorporated in a circuit of the processor. In this case, the processor realizes the processing unit 20A by reading and executing the program incorporated in the circuit.

Note that a part of the functions of the mobile body 10 illustrated in FIG. 2 may be provided in another device. For example, a camera 10B, a sensor 10C, and the like may be mounted on a mobile body 10, and an information processing device 20 may be caused to operate as a server device installed outside the mobile body 10. In this case, a communication unit 10D transmits data observed by the camera 10B, the sensor 10C, and the like to the server device.

Figure 4:
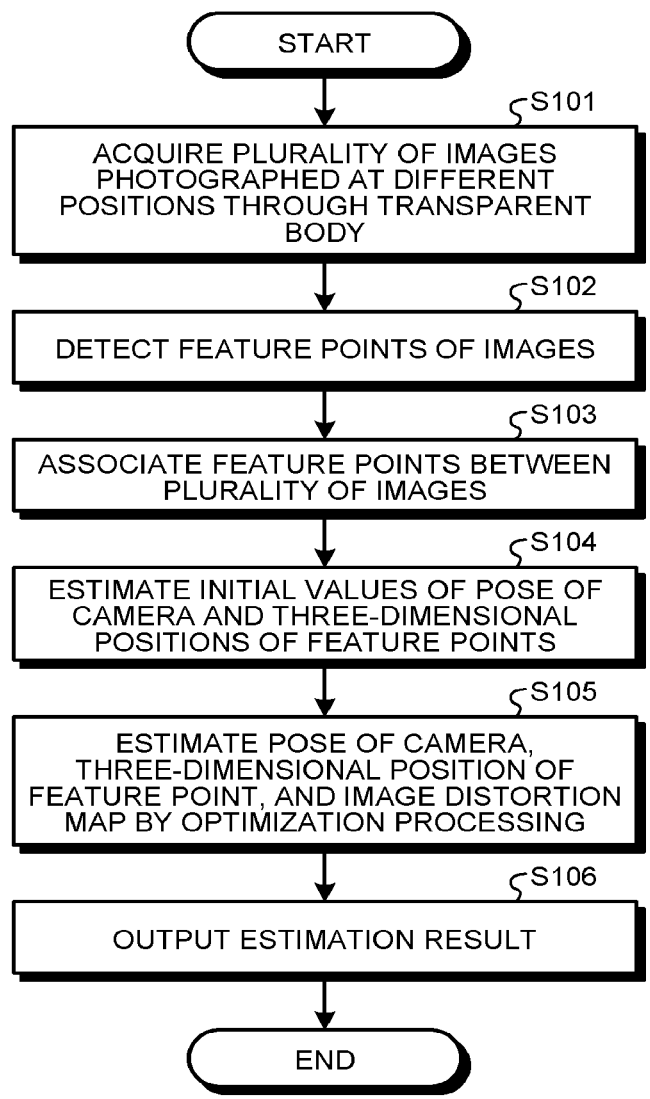
FIG. 4 is a flowchart of estimation processing in the first embodiment.

Next, estimation processing by the information processing device 20 according to the first embodiment configured in such a manner will be described. FIG. 4 is a flowchart illustrating an example of estimation processing in the first embodiment. In the following, an example in which a mobile body 10 is a vehicle, a camera 10B is installed in a manner of facing a front side of the vehicle, and the front side of the vehicle is imaged through a windshield 30 will be described.

The acquisition module 101 acquires a plurality of images photographed at different positions through the windshield 30 (Step S101). First, the acquisition module 101 acquires an image acquired by the camera 10B by imaging of the front side of the vehicle at a certain time point.

The camera 10B is fixed to an inner side of the vehicle with respect to the windshield 30. Thus, an image is captured through the windshield 30. Distortion is generated in the windshield 30, and the image captured through the windshield 30 is distorted due to the distortion of the glass. The distortion of the windshield 30 means that a deviation from incident light is generated by refraction of light. There are the following types of distortion, for example.

Difference in thickness, and global distortion in design such as curved surface shape Inflection and wavy unevenness due to fixed circumference Small local distortion such as temporal change due to temperature change FIG. 5 is a view illustrating an example of image distortion due to an influence of the windshield 30. As illustrated in a drawing on a left side, in a case where there is no windshield 30, an intersection 511 between a straight line connecting a three-dimensional point 501 and a center of the camera 10B, and of an image plane is an observation point.

In a case where there is the windshield 30, refraction is generated according to a thickness of the windshield 30 and an incident angle of light. Thus, an intersection 512 corresponding to the same three-dimensional point 501 is observed at a position different from that of the intersection 511 on the image. In such a manner, a deviation 513 due to refraction through the windshield 30 is observed as image distortion. Also, an image may be distorted according to a relative positional relationship between the camera 10B and the windshield 30. For example, in a case where the windshield 30 is inclined with respect to an imaging surface of the camera 10B, an image is distorted. In such a manner, an image captured through the windshield 30 has different distortion at each position on the image.

The acquisition module 101 further acquires an image captured through the windshield 30 after the mobile body 10 is moved to a different position. By repeating such processing, the acquisition module 101 acquires a plurality of images photographed at different positions.

For example, the camera 10B captures images at regular time intervals in a traveling vehicle and outputs time-series images. When it is assumed that the one camera 10B is mounted on the mobile body 10, distorted images are necessary in at least two different positions.

In the above, a case where a relative positional relationship between the mobile body 10 and the camera 10B is fixed has been described. In a case where the camera 10B can be moved relative to a reference point of the mobile body 10, the camera 10B may be moved separately from movement of the mobile body 10. For example, in a case where the camera 10B is installed at a leading end of an arm, only the arm may be moved.

Returning to FIG. 4, the detection module 102 detects feature points of the plurality of distorted images acquired by the acquisition module 101 (Step S102). The estimation module 103 associates identical feature points among the feature points detected respectively in the plurality of distorted images (Step S103).

For example, the estimation module 103 performs association using a scale invariant feature transform (SIFT) feature. An associating method is not limited to this, and may be any method. The estimation module 103 may use a method in which it is considered that the images are distorted by the windshield 30. For example, when a region around a feature line is divided, the estimation module 103 may set limitation to a region that is not influenced much by distortion.

Next, the estimation module 103 estimates an initial value of a pose of the camera 10B and initial values of three-dimensional positions of the feature points (Step S104). For example, the estimation module 103 estimates the pose of the camera 10B and the three-dimensional positions of the feature points without considering image distortion, and sets these as initial values. For the estimation of the initial values, SfM or the like may be used with the feature points, for example.

Also, the estimation module 103 may estimate an initial value of a pose by using sensor data detected by external another sensor (such as IMU or wheel encoder) without using a feature point for the estimation of the pose. Also, the estimation module 103 may use an image captured by another camera without the windshield 30.

An error is generated in the three-dimensional reconstruction in which image distortion due to the windshield 30 is not considered. FIG. 6 to FIG. 9 are views for describing errors that may be generated due to image distortion. In FIG. 6 to FIG. 9, an example in which one feature point corresponding to an object is imaged in two poses through the windshield 30 is illustrated.

Figure 6:
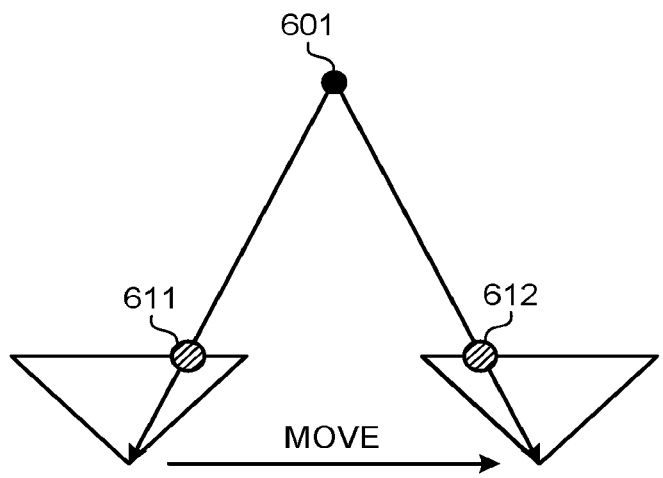
FIG. 6 is a view for describing an error that may be generated due to image distortion.

FIG. 6 is an example of three-dimensional reconstruction of a case where there is no windshield 30. In this case, since it is not necessary to consider image distortion, an intersection of two straight lines connecting a center of the camera 10B with observation points 611 and 612 respectively is reconstructed as a three-dimensional point 601.

Figure 7:
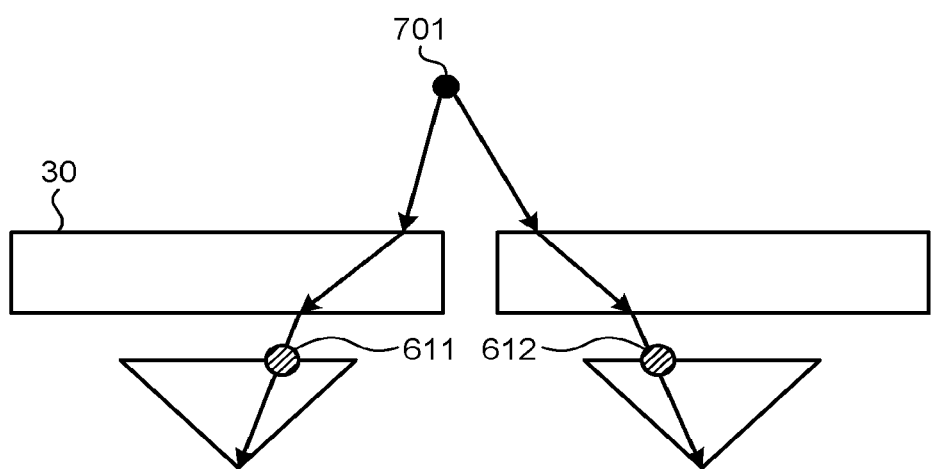
FIG. 7 is a view for describing an error that may be generated due to image distortion.

FIG. 7 is a view illustrating an example of three-dimensional reconstruction of a case where refraction of light by the windshield 30 is considered. A three-dimensional point 701 indicates a point reconstructed in consideration of refraction.

Figure 8:
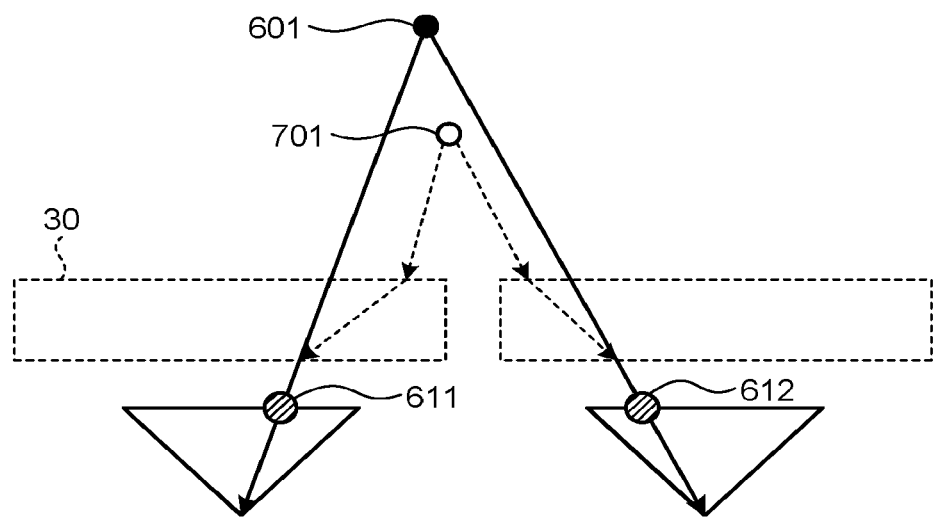
FIG. 8 is a view for describing an error that may be generated due to image distortion.

FIG. 8 is a view illustrating an example in which three-dimensional reconstruction is performed without consideration of image distortion although there is the windshield 30. In this case, a wrong three-dimensional point 601 is reconstructed. With respect to a pose, for example, in a case where the pose is estimated with a feature point as a reference without utilization of an external sensor, a pose including an error due to image distortion is estimated.

Figure 9:
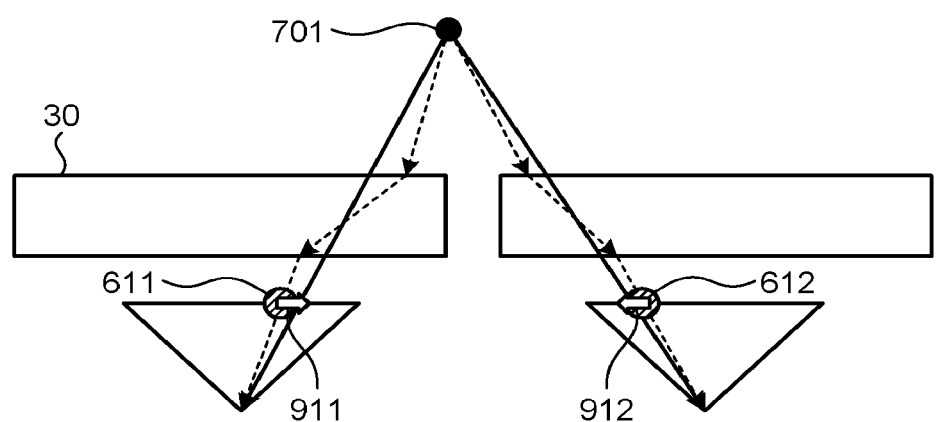
FIG. 9 is a view for describing an error that may be generated due to image distortion.

FIG. 9 is a view illustrating an example in which image distortion is considered as image distortion flows 911 and 912 indicating deviations on images according to the present embodiment. Details of FIG. 9 will be described later.

Returning to FIG. 4, the estimation module 103 estimates a pose, a three-dimensional position of a feature point, and a distortion map by correcting and optimizing a detection position of a feature point by a flow indicating image distortion at each position on an image (image distortion flow) by using the estimated initial value (Step S105).

Details of the estimation processing will be described with reference to FIG. 9. In the three-dimensional reconstruction in which refraction by the windshield 30 is considered, an optical path from a center of a camera to a three-dimensional point cannot be expressed by one straight line. Thus, it is necessary to follow a path of a light ray and to consider an incident angle to the windshield 30, and realization is not easy. In the present embodiment, deviations of observation points due to refraction by the windshield 30 are replaced with the image distortion flows 911 and 912. Then, an intersection of straight lines respectively connecting points acquired by correction of observation points 611 and 612 on images, that is, detection positions of feature points by the image distortion flows 911 and 912, and the center of the camera 10B is estimated as a three-dimensional point 701.

Figure 10:
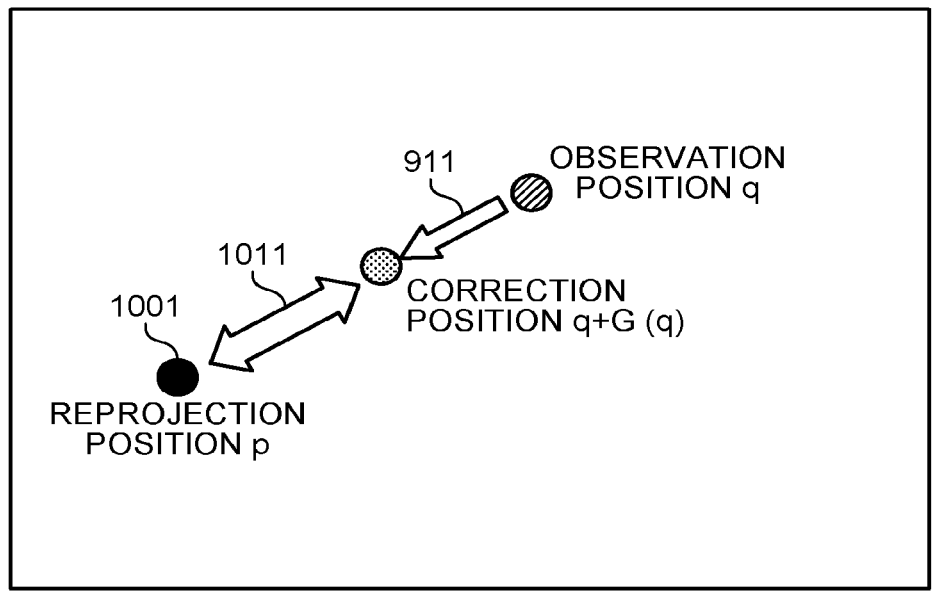
FIG. 10 is a view for describing correction and optimization processing by an image distortion flow.

FIG. 10 is a view for describing correction and optimization processing by an image distortion flow. The estimation module 103 projects a feature point i onto an image and acquires a reprojection position $p_{ij}$ (point 1001) on the basis of a three-dimensional position of the feature point i and a pose j of the camera 10B. On the one hand, the estimation module 103 corrects a detection position of the feature point on the image by an image distortion flow $G(q_{ij})$ (image distortion flow 911) acquired from a distortion map G. The distortion map G can be interpreted as a function that outputs the image distortion flow corresponding to the designated detection position $q_{ij}$. The estimation module 103 minimizes the following equation (1) with a difference between a correction position $q_{ij}+G(q_{ij})$ and the reprojection position $p_{ij}$ as a reprojection error (arrow 1011).

$$E=\Sigma_{(i,j)}(p_{ij}-(q_{ij}+G(q_{ij})))^2 \qquad (1)$$

The sum in the equation (1) is calculated for a pair (i, j) of the feature point i and the pose j corresponding to the image in which the feature point i is detected. The equation (1) is an example of the reprojection error, and an equation other than the equation (1) may be used as long as being an error function of evaluating a difference between a correction position and a reprojection position.

The estimation module 103 may use any method as an optimization method. For example, the estimation module 103 may use nonlinear optimization by the Levenberg Marquardt (LM) method. The estimation module 103 estimates one distortion map for all images.

A distortion map may have a flow of each pixel position as a parameter, or may have a flow of a lattice point sparser than the pixel as a parameter. That is, a distortion map may be expressed at the same resolution as an image, or may be expressed at resolution smaller than that of an image. In the latter case, a flow is modified according to a difference between resolution of a distortion map and resolution of detection information. For example, a value of a flow with respect to a detection position (pixel) in a lattice is acquired by interpolation of flows of surrounding lattice points. A value of a flow with respect to a lattice including a detection position may be used as a value of a flow for the detection position.

A constraint term on a distortion map may be added to the error function. For example, a smoothing term of a flow at an adjacent lattice point, and a bias term with displacement of a flow from a specific model as a parameter may be added to the error function.

In the above description, a result of estimation without consideration of image distortion is used as an initial value. However, the estimation module 103 may estimate an initial value in consideration of image distortion. Also, although an image distortion flow to correct a detection position of a feature point on an image is estimated as a distortion map, a flow to correct a reprojection position of a three-dimensional point of a feature point may be estimated as a distortion map.

Returning to FIG. 4, the estimation module 103 outputs an estimation result (Step S106). For example, the estimation module 103 outputs at least one of a pose, a three-dimensional position of a feature point, and a distortion map as an estimation result. For example, the output distortion map can be used when image-based three-dimensional reconstruction is executed subsequently.

As described above, the information processing device of the first embodiment estimates a pose, a three-dimensional position of a feature point, and distortion of an image by acquiring a distorted image captured through a transparent body such as a windshield, detecting a feature point from the image, and correcting and optimizing a detection position of the feature point by a distortion map. At this time, the distortion map is estimated together with the pose and the three-dimensional position of the feature point. Thus, distortion of an image due to a transparent body can be estimated as a distortion map by a flow at each position of a local image without generation of an image in which distortion is corrected. Furthermore, in all of a plurality of images, feature points are consistent with respect to a transparent body and a camera motion, and more accurate three-dimensional reconstruction can be realized.

Second Embodiment

An information processing device according to the second embodiment estimates a distortion map for each of a plurality of groups into which images are classified.

Figure 11:
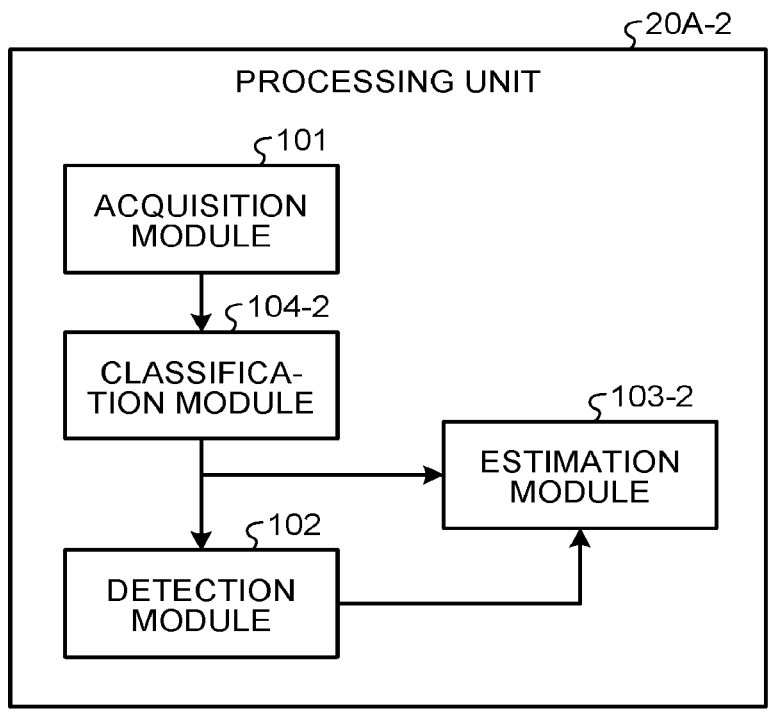
FIG. 11 is a block diagram of a processing unit of a second embodiment.

In the second embodiment, a function of a processing unit is different from that in the first embodiment. Since the other configurations are similar to those in FIG. 2, a description thereof will be omitted. FIG. 11 is a block diagram illustrating an example of a configuration of a processing unit 20A-2 according to the second embodiment. As illustrated in FIG. 11, the processing unit 20A-2 includes an acquisition module 101, a detection module 102, an estimation module 103-2, and a classification module 104-2.

The second embodiment is different from the first embodiment in a point that a function of the estimation module 103-2, and the classification module 104-2 are added. Since the other configurations and functions are similar to those in FIG. 3 that is a block diagram of the processing unit 20A according to the first embodiment, the same sign is assigned and a description thereof is omitted herein.

The classification module 104-2 classifies a plurality of acquired images into a plurality of groups including a plurality of images having similar distortion to each other. A group is a set of images classified according to predetermined conditions. Images included in a group is preferably classified in such a manner as to have similar or identical distortion. The classification module 104-2 classifies images as follows, for example.

(R1) A plurality of images having similar relative positions between a camera 10B and a windshield 30 are classified into the same group.

(R2) A plurality of images having distortions due to a windshield 30 in similar states are classified into the same group.

The acquisition module 101 may be configured to acquire images classified into groups by an external device, or the acquisition module 101 may be configured to classify images into groups while performing acquisition thereof. In this case, it can be interpreted that the acquisition module 101 has a function of the classification module 104-2.

The estimation module 103-2 is different from the estimation module 103 of the first embodiment in a point that a distortion map, a three-dimensional position, and a detection position are estimated for each of a plurality of groups. When correcting a detection position of a feature point by a distortion flow of a corresponding position in a distortion map, the estimation module 103-2 uses a distortion map unique for a group to which an image in which the feature point is detected belongs. As a result, the same distortion map can be estimated for each image that belongs to the group.

In the following, a specific example of a classification method of groups and estimation of each group will be described.

With respect to (R1) in the above, the following classification methods can be used. For example, in a case where a plurality of cameras 10B is included, the classification module 104-2 sets a group for each of the plurality of cameras 10B, and classifies images respectively acquired from the plurality of cameras 10B into corresponding groups.

It is assumed that a plurality of cameras 10B (camera 10B-*a* and camera 10B-*b*) is mounted on a mobile body 10. For example, right and left cameras of a stereo camera may be the camera 10B-*a* and the camera 10B-*b*, respectively. The camera 10B-*a* and the camera 10B-*b* may be cameras respectively mounted on a plurality of vehicles. At least one of the camera 10B-*a* and the camera 10B-*b* may be a camera fixed to a roadside.

The classification module 104-2 classifies distorted images captured by the camera 10B-*a* into a group G-a, and distorted images captured by the camera 10B-b into a group G-b.

The estimation module 103-2 estimates two distortion maps that are a distortion map M-a corresponding to the camera 10B-*a* and a distortion map M-b corresponding to the camera 10B-*b*. In a case where a plurality of different cameras 10B is used, images are captured by the cameras 10B respectively through different windshields 30. According to the present embodiment, it is possible to estimate a pose and a three-dimensional position of a feature point in consideration of an influence of image distortion by each windshield 30.

As another example of (R1), in a case where a relative positional relationship between a camera 10B and a windshield 30 changes, the classification module 104-2 may classify images before and after the change into different groups. For example, the classification module 104-2 detects a change in a position of a specific object (such as hood of a vehicle) imaged in an image by an analysis or the like of the image, and classifies images before and after the change into different groups in a case where the position changes.

With respect to (R2) in the above, the following classification methods can be used, for example. For example, the classification module 104-2 classifies a plurality of images acquired by one camera 10B on the basis of a traveling place of the mobile body 10. For example, with a traveling distance as a condition, the classification module 104-2 may perform classification into a new group every time traveling is performed for a certain distance (such as 100 m). In this case, the estimation module 103-2 estimates a distortion map for each traveling section.

The classification module 104-2 may classify images with acquisition time as a condition. For example, the classification module 104-2 classifies the acquired images into different groups at regular intervals (such as several seconds). In this case, the estimation module 103-2 estimates a distortion map at regular intervals.

The classification module 104-2 may classify images with a plurality of predetermined periods of time (such as morning, noon, and evening) as conditions. As a result, the estimation module 103-2 can estimate a distortion map for each period of time even when a state of a windshield 30 changes due to changes in an outside air temperature and weather and image distortion changes.

In such a manner, even in a case where image distortion due to the windshield 30 gradually changes, a pose and a three-dimensional position of a feature point can be estimated in consideration of an influence of the image distortion due to the windshield 30.

The classification module 104-2 may classify images with a state of the windshield 30 as a condition. For example, the classification module 104-2 may perform classification into groups according to transparency and color of the windshield 30. For example, the classification module 104-2 detects changes in the transparency and color of the windshield 30 by analyzing acquired images, and classifies the images according to a detection result.

Figure 12:
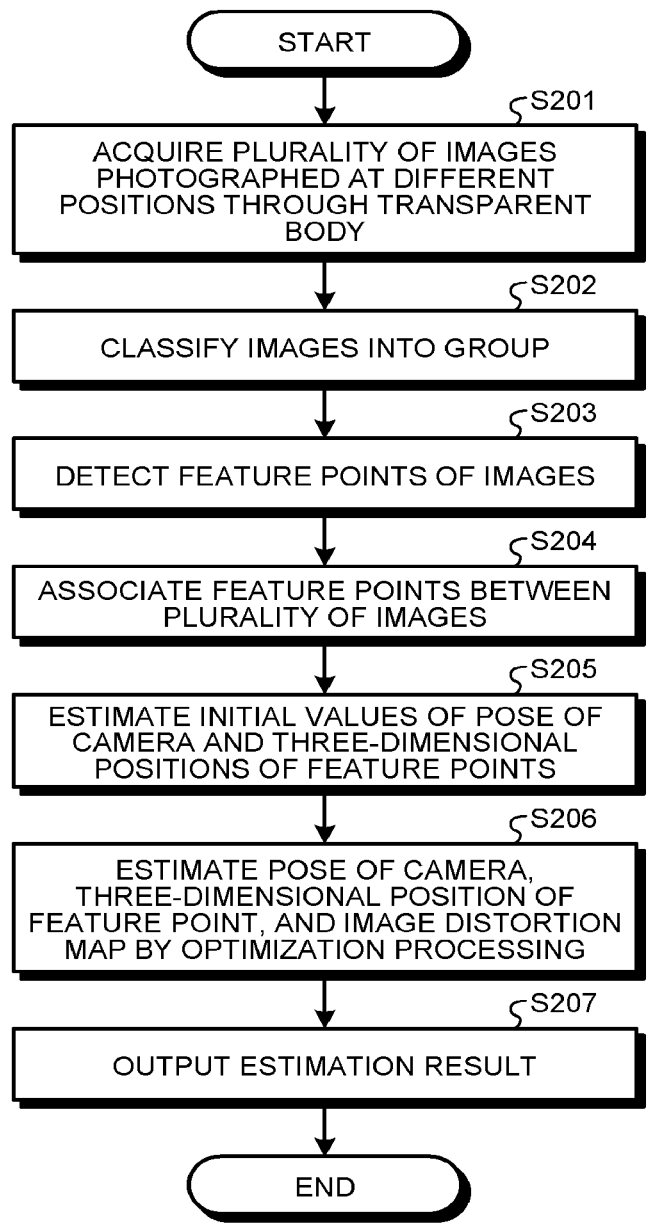
FIG. 12 is a flowchart of estimation processing in the second embodiment.

Next, estimation processing by the information processing device according to the second embodiment configured in such a manner will be described with reference to FIG. 12. FIG. 12 is a flowchart illustrating an example of estimation processing in the second embodiment.

Step S201 is processing similar to that in Step S101 in the information processing device 20 according to the first embodiment.

In the present embodiment, the classification module 104-2 classifies a plurality of acquired images into groups (Step S202). Step S203 to Step S207 thereafter are different from Step S102 to Step S106 in the information processing device 20 according to the first embodiment in a point of being executed for each group.

As described above, different distortion maps are respectively estimated for groups in the second embodiment. As a result, even in a case where a plurality of images having different image distortion are included, locally independent image distortion can be estimated as a flow at each position of an image without generation of a distortion-corrected image.

Third Embodiment

An information processing device according to the third embodiment generates a mask indicating a region in which a distortion map is estimated, corrects a feature point according to the generated mask, and estimates a distortion map.

Figure 13:
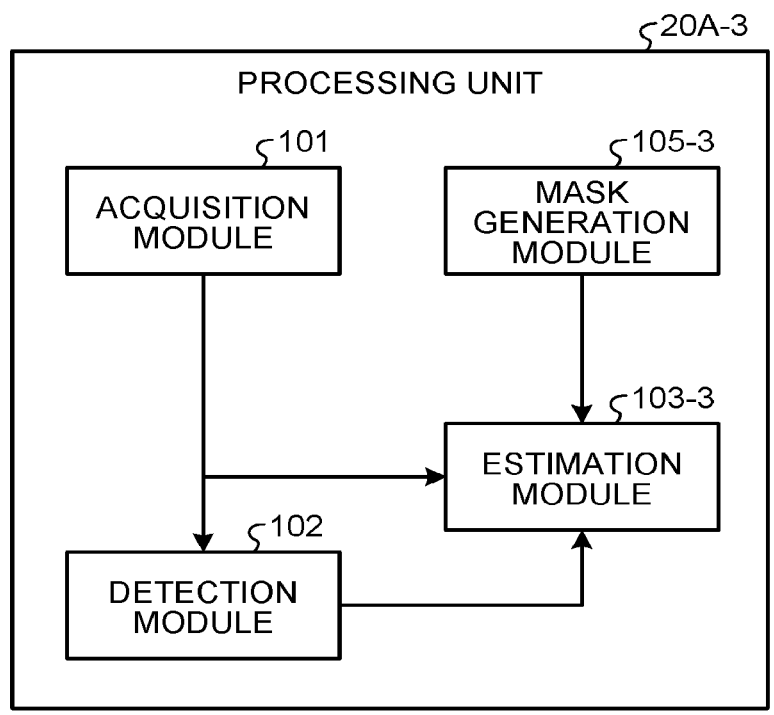
FIG. 13 is a block diagram of a processing unit of a third embodiment.

In the third embodiment, a function of a processing unit is different from that in the first embodiment. Since the other configurations are similar to those in FIG. 2, a description thereof will be omitted. FIG. 13 is a block diagram illustrating an example of a configuration of a processing unit 20A-3 according to the third embodiment. As illustrated in FIG. 13, the processing unit 20A-3 includes an acquisition module 101, a detection module 102, an estimation module 103-3, and a mask generation module 105-3.

The third embodiment is different from the first embodiment in a point that a function of the estimation module 103-3 and the mask generation module 105-3 are added. Since the other configurations and functions are similar to those in FIG. 3 that is a block diagram of the processing unit 20A according to the first embodiment, the same sign is assigned and a description thereof is omitted herein.

The mask generation module 105-3 generates a mask indicating a region in which a distortion map is generated. The region indicated by the mask is preferably a region where an image distortion flow needs to be estimated or can be estimated. A specific example of a mask will be described later. The mask generation module 105-3 may generate a mask for each camera 10B, or may generate a mask for each image.

The mask may be expressed by a binary indicating whether to estimate a distortion map, or may be expressed by a continuous value such as priority in estimation. In any case, the mask generation module 105-3 designates a region in which a distortion map is estimated in an image, and generates a mask indicating a region in which a distortion map is not estimated in other regions.

The estimation module 103-3 corrects a feature point on the basis of the generated mask and estimates a distortion map. Unlike the first embodiment, the estimation module 103-3 of the present embodiment does not correct positions of all feature points, and corrects only a feature point included in the region indicated by the mask. For example, the estimation module 103-3 estimates an image distortion flow and corrects a position of a feature point in the region indicated by the mask. The estimation module 103-3 does not estimate a flow in other regions on the assumption that no image distortion is generated, and uses a position of the detected feature point as it is for evaluation of a reprojection error.

The above example is an example of a case where a mask is expressed by a binary. That is, in a region in which a value indicating that a distortion map is to be estimated is designated, the estimation module 103-3 corrects a feature point and estimates the distortion map. In a case where a mask is expressed by a continuous value, each feature point may be weighted according to the continuous value. For example, in the equation (1), the estimation module 103-3 may use a function G modified in such a manner as to use information of a feature point weighted according to the continuous value.

Next, an example of a mask in the present embodiment is illustrated. The mask generation module 105-3 can generate a mask by the following methods, for example.

(M1) A mask indicating a region captured by light transmitted through a windshield 30 among regions included in an image is generated.

(M2) A mask indicating a region including a specific object in an image is generated.

(M3) A mask indicating a region including more feature points than other regions is generated.

Details of (M1) will be described. There is a case where a windshield 30 does not cover an entire camera 10B and only a part of an image captured by the camera 10B is captured through the windshield 30. In such a case, the mask generation module 105-3 generates a mask indicating a region of an image captured through the windshield 30.

For example, in a case where the camera 10B is installed through a movable window, there is a case where the window appears only in a part of an image by opening and closing of the window. In such a case, the mask generation module 105-3 generates a mask indicating only a region of the window. For example, the mask generation module 105-3 can determine whether a region in the image is the region of the window by analyzing the image.

The mask generation module 105-3 may respectively generate different masks for a plurality of cameras 10B. As a result, appropriate estimation processing can be performed even in a configuration in which a camera 10B that images an object through a windshield 30 and a camera 10B that images the object without the windshield 30 are mixed.

By the method (M1), a distortion map of a part of an image can be estimated by generation of a mask indicating a region imaged through a windshield 30 in the image. That is, even in a case where a windshield 30 appears in a part of an image, highly accurate three-dimensional reconstruction can be performed.

Details of (M2) will be described. A region including a specific object is, for example, a region including an object other than a mobile body (another mobile body different from a mobile body 10). Note that (M2) can be also interpreted to "generate a mask indicating a region that does not include a specific object in an image" with a mobile body as the specific object.

The estimation module 103-3 projects each three-dimensional point in a three-dimensional space onto a different position in an image. Here, it is assumed that the three-dimensional point does not move while images at different positions are captured. The mask generation module 105-3 generates a mask indicating a region what is other than the mobile body. For estimation of a distortion map, the estimation module 103-3 does not use a feature point in a region corresponding to the mobile body.

Other than the mobile body, an object to be excluded may be an object such as a repeating structure in which association of a feature point easily fails. The object to be excluded can be detected, for example, by utilization of detection technology such as semantic segmentation and specific object recognition.

Details of (M3) will be described. The mask generation module 105-3 generates, as a mask, a region including more feature points than other regions, in other words, a region in which feature points can be sufficiently detected. The estimation module 103-3 estimates a distortion map by totally optimizing distortion flows of feature points detected at the same position in a plurality of images. However, when the number of feature points is small in a range in which flows are estimated, estimation accuracy deteriorates. Thus, it is preferable to estimate a distortion map only in a region where estimation accuracy is guaranteed by using a mask.

A region including more feature points than other regions is, for example, a region in which the number of feature points or density of feature points exceeds a threshold. For example, the mask generation module 105-3 calculates the number of feature points or the density of feature points, and generates a mask indicating a region in which the calculated value exceeds the threshold.

Next, estimation processing by the information processing device according to the third embodiment configured in such a manner will be described with reference to FIG. 14. FIG. 14 is a flowchart illustrating an example of estimation processing in the third embodiment.

Step S301 and S302 are processing similar to Step S101 and S102 in the information processing device 20 according to the first embodiment.

In the present embodiment, the mask generation module 105-3 generates a mask (Step S303).

Step S304 and S305 are processing similar to Step S103 and S104 in the information processing device 20 according to the first embodiment.

In the present embodiment, the estimation module 103-3 performs estimation by using the mask (Step S306). For example, the estimation module 103-3 corrects only a feature point included in a region indicated by the mask, and estimates a flow. In a case where the mask is expressed by a continuous value, the estimation module 103-3 may perform estimation while weighting each feature point according to the continuous value.

Step S307 is processing similar to that in Step S106 in the information processing device 20 according to the first embodiment.

In such a manner, in the third embodiment, a feature point is corrected with a region where a distortion map is estimated being limited by a mask, whereby it becomes possible to perform highly accurate three-dimensional reconstruction in which an influence of distortion of the windshield 30 is removed.

As described above, according to the first to third embodiments, a position or the like of an object can be estimated with higher accuracy.

A program executed in the information processing device according to each of the first to third embodiments is previously installed in a ROM 52 or the like and provided.

A program executed in the information processing device according to each of the first to third embodiments may be recorded, as a file in an installable format or an executable format, into a computer-readable recording medium such as a compact disk read only memory (CD-ROM), a flexible disk (FD), a compact disk recordable (CD-R), or a digital versatile disk (DVD), and provided as a computer program product.

Moreover, a program executed in the information processing device according to each of the first to third embodiments may be stored on a computer connected to a network such as the Internet and may be provided by being downloaded via the network. Also, a program executed in the information processing device according to each of the first to third embodiments may be provided or distributed via a network such as the Internet.

A program executed in the information processing device according to each of the first to third embodiments may cause a computer to function as each unit of the information processing device described above. In this computer, a CPU 51 can read a program from a computer-readable storage medium onto a main storage device and perform execution thereof.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing device comprising:
one or more processors configured to:
acquire a plurality of pieces of detection information that is information including detection results at two-dimensional positions different from each other acquired by detection of an object by one or more detection devices through a transmission body, the plurality of pieces of detection information each including distortion due to the transmission body that exists between the detection devices and the object;
detect a feature point from each of the plurality of pieces of detection information; and
estimate, by minimizing an error between a three-dimensional position corresponding to the feature point and a detection position of the feature point corrected based on an initial distortion map expressing distortion at each of the two-dimensional positions, a revised distortion map, the three-dimensional position, and the detection position, wherein
the initial distortion map is expressed at a resolution smaller than that of the pieces of detection information, and
the feature point is corrected by using the distortion corrected according to a difference between the resolution of the initial distortion map and the resolution of the pieces of detection information.

2. The device according to claim 1, wherein the distortion is a displacement amount at each of the two-dimensional positions.

3. The device according to claim 1, wherein the one or more processors are configured to:
classify the acquired plurality of pieces of detection information into a plurality of groups including a plurality of pieces of detection information having similar distortion to each other; and
estimate the revised distortion map, the three-dimensional position, and the detection position for each of the plurality of groups.

4. The device according to claim 3, wherein the one or more processors are configured to classify, into a same group, a plurality of pieces of detection information in which relative positions between the detection devices and the transmission body are similar.

5. The device according to claim 3, wherein the one or more processors are configured to classify, into a same group, a plurality of pieces of detection information including distortions due to the transmission body in similar states.

6. The device according to claim 1, wherein the one or more processors are configured to:
generate a mask indicating a region in which the revised distortion map is estimated; and
correct the feature point based on the initial distortion map expressing the distortion at each position included in the region indicated by the mask.

7. The device according to claim 6, wherein the one or more processors are configured to generate the mask indicating a region including a detection result detected by an electromagnetic wave transmitted through the transmission body among regions included in the pieces of detection information.

8. The device according to claim 6, wherein the one or more processors are configured to generate the mask indicating a region including a specific object in the pieces of detection information.

9. The device according to claim 6, wherein the one or more processors are configured to generate the mask indicating a region including more feature points than other regions.

10. The device according to claim 3, wherein
the plurality of pieces of detection information are a plurality of images, and
the one or more processors are configured to classify the plurality of images into the plurality of groups.

11. The device according to claim 1, wherein
the detection devices include a camera, and
the transmission body includes a transparent body that transmits visible light.

12. An information processing method comprising:
acquiring a plurality of pieces of detection information that is information including detection results at two-dimensional positions different from each other acquired by detection of an object by one or more detection devices through a transmission body, the plurality of pieces of detection information each including distortion due to the transmission body that exists between the detection devices and the object;
detecting a feature point from each of the plurality of pieces of detection information; and
estimating, by minimizing an error between a three-dimensional position corresponding to the feature point and a detection position of the feature point corrected based on an initial distortion map expressing distortion at each of the two-dimensional positions, a revised distortion map, the three-dimensional position; and the detection position, wherein
the initial distortion map is expressed at a resolution smaller than that of the pieces of detection information, and
the feature point is corrected by using the distortion corrected according to a difference between the resolution of the initial distortion map and the resolution of the pieces of detection information.

13. A computer program product comprising a non-transitory computer readable medium including programmed instructions, the instructions causing a computer to execute:
acquiring a plurality of pieces of detection formation that is information including detection results at two-dimensional positions different from each other acquired by detection of an object by one or more detection devices through a transmission body, the plurality of pieces of detection information each including distortion due to the transmission body that exists between the detection devices and the object;
detecting a feature point from each of the plurality of pieces of detection information; and
estimating, by minimizing an error between a three-dimensional position corresponding to the feature point and a detection position of the feature point corrected based on an initial distortion map expressing distortion at each of the two-dimensional positions, a revised distortion map, the three-dimensional position, and the detection position, wherein
the initial distortion map is expressed at a resolution smaller than that of the pieces of detection information, and
the feature point is corrected by using the distortion corrected according to a difference between the resolution of the initial distortion map and the resolution of the pieces of detection information.

14. A vehicle control system that controls a vehicle, the system comprising:
an information processing device configured to estimate a three-dimensional position of an object; and
a vehicle control device configured to control a drive mechanism to drive the vehicle based on the three-dimensional position,
the information processing device comprising:
one or more processors configured to:
acquire a plurality of pieces of detection information that is information including detection results at two-dimensional positions different from each other acquired by detection of the object by one or more detection devices through a transmission body, the plurality of pieces of detection information each including distortion due to the transmission body that exists between the detection devices and the object,
detect a feature point from each of the plurality of pieces of detection information, and
estimate, by minimizing an error between a three-dimensional position corresponding to the feature point and a detection position of the feature point corrected based on an initial distortion map expressing distortion at each of the two-dimensional positions, a revised distortion map, the three-dimensional position, and the detection position, wherein
the initial distortion map is expressed at a resolution smaller than that of the pieces of detection information, and
the feature point is corrected by using the distortion corrected according to a difference between the resolution of the initial distortion map and the resolution of the pieces of detection information.

* * * * *